(12) United States Patent
Hosoda

(10) Patent No.: US 10,707,710 B2
(45) Date of Patent: Jul. 7, 2020

(54) ROTOR WITH SINTERED U-SHAPED MAGNETS

(71) Applicant: FANUC CORPORATION, Yamanashi (JP)

(72) Inventor: Akihiro Hosoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 108 days.

(21) Appl. No.: 15/893,171

(22) Filed: Feb. 9, 2018

(65) Prior Publication Data

US 2018/0241265 A1    Aug. 23, 2018

(30) Foreign Application Priority Data

Feb. 23, 2017  (JP) .................................. 2017-032096

(51) Int. Cl.
*H02K 1/27*     (2006.01)
(52) U.S. Cl.
CPC .................. *H02K 1/2766* (2013.01)
(58) Field of Classification Search
CPC .... H02K 1/2766; H02K 1/2773; H02K 1/276; H02K 21/14
USPC ........................................ 310/156.56, 156.53
See application file for complete search history.

(56) References Cited

U.S. PATENT DOCUMENTS

| | | | |
|---|---|---|---|
| 2015/0171682 A1* | 6/2015 | Fujisawa .............. | H02K 1/2766 310/156.53 |
| 2015/0270751 A1* | 9/2015 | Cao ..................... | H02K 1/2773 310/156.56 |

FOREIGN PATENT DOCUMENTS

| | | |
|---|---|---|
| JP | 2002-134311 A | 5/2002 |
| JP | 2003-201501 A | 7/2003 |
| JP | 2004-336831 A | 11/2004 |
| JP | 3145510 U | 9/2008 |
| JP | 2013-207943 A | 10/2013 |
| JP | 2015-133839 A | 7/2015 |
| JP | 2016-096665 A | 5/2016 |
| JP | 2016-100927 A | 5/2016 |

(Continued)

OTHER PUBLICATIONS

Machine translation of JP-2016096665-A. (Year: 2016).*

(Continued)

*Primary Examiner* — Michael Andrews
(74) *Attorney, Agent, or Firm* — Studebaker & Brackett PC

(57) ABSTRACT

The present invention is to provide a rotor capable of further increasing curvature of a permanent magnet while absorbing strain in the permanent magnet.
A rotor having an embedded magnet type structure includes a rotor core having a plurality of slots disposed in a circumferential direction and a plurality of magnet parts respectively stored in the plurality of slots. Each of the plurality of magnet parts includes a pair of first sintered magnets each of which has a bar shape in a sectional view cut along a plane orthogonal to a rotary shaft and each of which is disposed so as to come closer to the other first sintered magnet along a radially inward direction of the rotor core, a second sintered magnet which has a curved shape curved in an arc shape in the sectional view and each of both end surfaces of which faces each of end surfaces in the radially inward direction of the pair of first sintered magnets, and a connecting member which is formed of resin and which connects each of the pair of first sintered magnets and the second sintered magnet.

4 Claims, 2 Drawing Sheets

(56) References Cited

FOREIGN PATENT DOCUMENTS

| JP | 2016096665 A | * | 5/2016 | |
| WO | 2014/046228 A1 | | 3/2014 | |
| WO | 2015/045027 A1 | | 4/2015 | |
| WO | 2015/093598 A1 | | 6/2015 | |
| WO | WO-2017016724 A1 | * | 2/2017 | ............. H02K 1/276 |

OTHER PUBLICATIONS

Machine translation of WO-2017016724-A1. (Year: 2017).*
An Office Action mailed by the Japanese Patent Office dated May 29, 2018, which corresponds to Japanese Patent Application No. 2017-032096 and is related to U.S. Appl. No. 15/893,171.
An Office Action mailed by the Japanese Patent Office dated Apr. 14, 2020, which corresponds to Japanese Patent Application No. 2017-032096 and is related to U.S. Appl. No. 15/893,171.

* cited by examiner

ROTOR WITH SINTERED U-SHAPED MAGNETS

This application is based on and claims the benefit of priority from Japanese Patent Application No. 2017-032096, filed on 23 Feb. 2017, the content of which is incorporated herein by reference.

BACKGROUND OF THE INVENTION

Field of the Invention

The present invention relates to a rotor having an embedded magnet type structure.

Related Art

Conventionally, a rotor having an Interior Permanent Magnet (IPM, embedded magnet type) structure has been known. In the rotor, in an example, a plurality of permanent magnets are embedded circumferentially in a rotor core so as to be spaced from one another. Embedding of a plurality of permanent magnets in a rotor core enables to obtain a high output not only by use of the torque caused by the permanent magnets but also the torque caused by the asymmetry in magnetic reluctance of a magnetic field (reluctance torque). Furthermore, since the permanent magnets are embedded, falling-off of the permanent magnets is enabled to be suppressed.

Each of the permanent magnets is preferably formed and disposed so as to concentrate magnetic fluxes toward a radially outward direction of the rotor core in order to obtain a high output. Proposed, in view of this, is a rotor in which permanent magnets are formed substantially in a V shape or substantially in a U shape and both ends thereof are disposed in a radially outward direction of the rotor core (for example, refer to Patent Document 1 and Patent Document 2).

Patent Document 1: Japanese Utility Model Publication No. 3145510

Patent Document 2: Japanese Unexamined Patent Application, Publication No. 2016-96665

SUMMARY OF THE INVENTION

For a rotor disclosed in Patent Document 1, a sintered magnet formed substantially in a U shape is adopted as a permanent magnet. The permanent magnet substantially in a U shape is disposed so that the both ends thereof face toward the radially outward direction of a rotor core. Thereby, the magnetic fluxes of the permanent magnets are enabled to concentrate in the radially outward direction of the rotor core. However, since the sintered magnets shrink by the heat generated when the rotor rotates, stress-strain may be generated in the permanent magnets. Considering the generation of the stress-strain, it is difficult to adopt sufficiently-curved sintered magnets.

For a rotor disclosed in Patent Document 2, a bonded magnet formed substantially in a U shape is adopted as a permanent magnet. Similarly as the permanent magnet disclosed in Patent Document 1, the permanent magnet substantially in a U shape is disposed so that the both ends thereof face toward the radially outward direction of a rotor core. Thereby, magnetic fluxes are enabled to concentrate by use of the sufficiently-curved sintered magnet. However, in some cases, the bonded magnet has broken due to drying by the heat generated when the rotor rotates.

The object of the present invention is to provide a rotor capable of further increasing curvature of a permanent magnet while absorbing strain in a permanent magnet.

(1) The present invention relates to a rotor having an embedded magnet type structure. The rotor having an embedded magnet type structure (for example, a rotor 1, which will be described below) includes a rotor core (for example, a rotor core 20, which will be described below) which rotates around a rotary shaft (for example, a rotor shaft 10, which will be described below) as a rotation center and which has a plurality of slots (for example, slots 21, which will be described below) disposed in a circumferential direction (for example, a circumferential direction D1, which will be described below), and a plurality of magnet parts (for example, magnet parts 30, which will be described below) respectively stored in the plurality of slots. Each of the plurality of magnet parts includes a pair of first sintered magnets (for example, first sintered magnets 31, which will be described below) each of which has a bar shape in a sectional view cut along a plane orthogonal to the rotary shaft and each of which is disposed so as to come closer to the other first sintered magnet along a radially inward direction (for example, a radially inward direction D2, which will be described below) of the rotor core, a second sintered magnet (for example, a second sintered magnet 32, which will be described below) which has a curved shape curved in an arc shape in the sectional view and each of both end surfaces of which faces each of end surfaces in the radially inward direction of the pair of first sintered magnets, and a connecting member (for example, a connecting member 33, which will be described below) which is formed of resin and which connects each of the pair of first sintered magnets and the second sintered magnet.

(2) In the rotor according to (1), in the sectional view, the connecting member may be disposed so as to be in contact with an inner surface of each of the plurality of slots and surfaces of the pair of first sintered magnets and the second sintered magnet.

(3) In the rotor according to (2), in the sectional view, the connecting member may be disposed so as to fill a gap between the inner surface of each of the plurality of slots and the first sintered magnets and between the inner surface of each of the plurality of slots and the second sintered magnet.

(4) In the rotor according to (1) to (3), in the sectional view, each of the first sintered magnets may be in a rectangular shape, and the second sintered magnet may be substantially in a U shape.

The present invention enables to provide a rotor capable of further increasing curvature of a permanent magnet while absorbing strain in the permanent magnet.

DETAILED DESCRIPTION OF THE INVENTION

Figure 1:
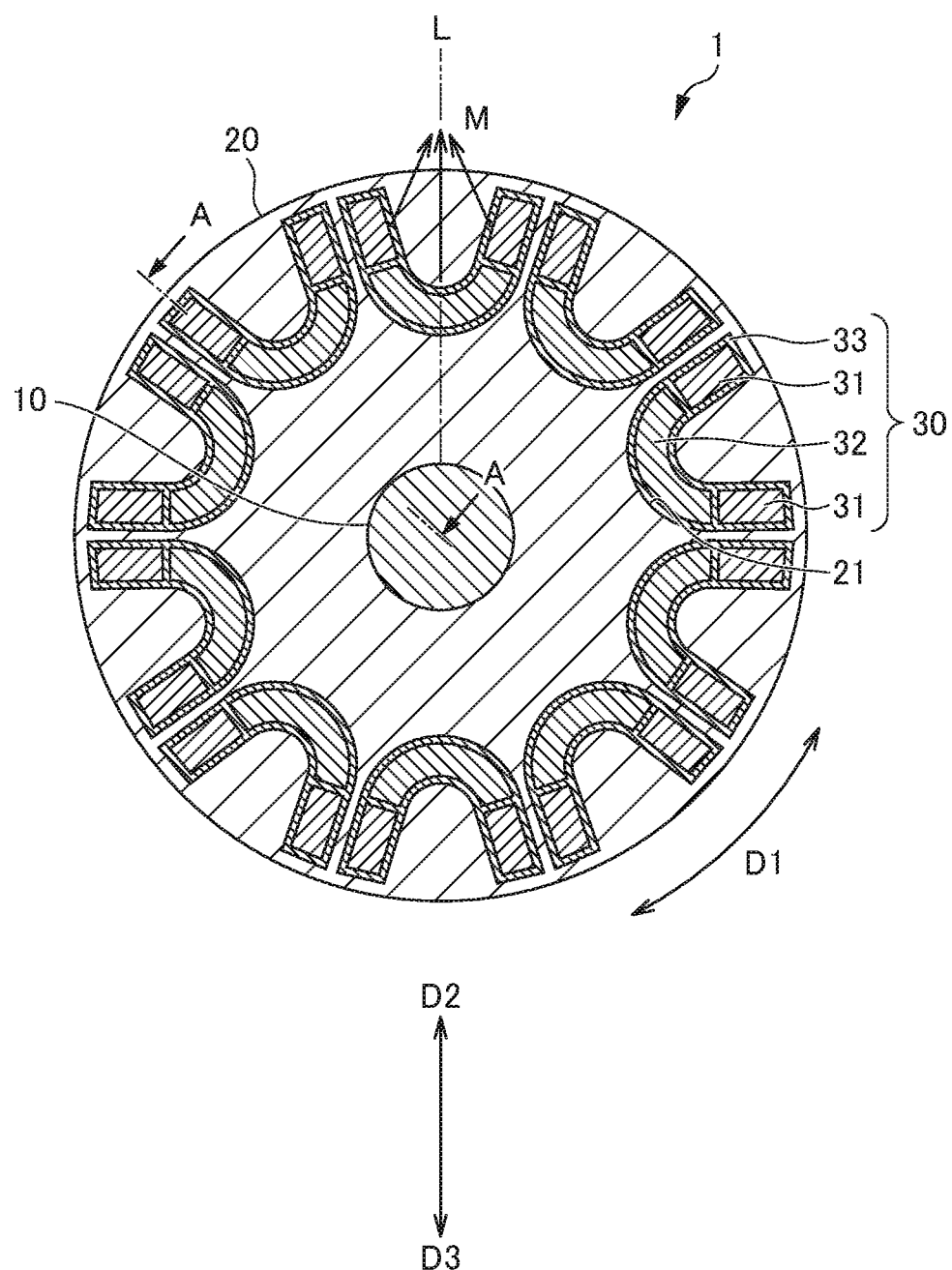
FIG. 1 is a sectional view illustrating a rotor according to one embodiment of the present invention.
Figure 2:
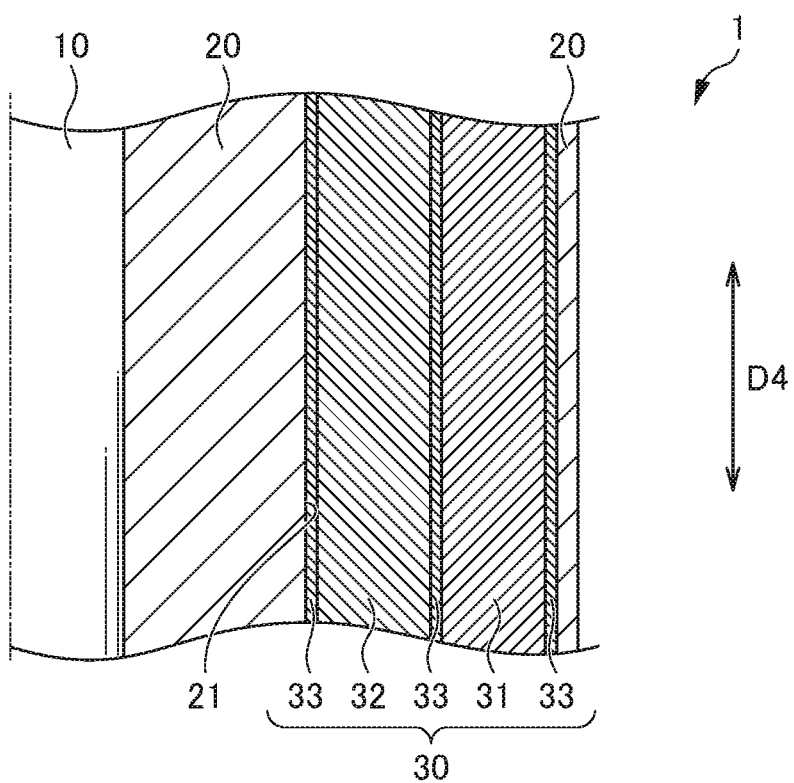
FIG. 2 is an A-A-line sectional view of FIG. 1.

Hereinafter, a rotor 1 according to one embodiment of the present invention is described with reference to FIG. 1 and FIG. 2. FIG. 1 is a sectional view illustrating the rotor 1 according to one embodiment of the present invention. FIG. 2 is an A-A-line sectional view of FIG. 1.

The rotor 1 according to the present embodiment is incorporated in an Interior Permanent Magnet (IPM, embedded magnet type) motor. As shown in FIG. 1 and FIG. 2, the rotor 1 includes a rotary shaft 10, a rotor core 20, and a magnet part 30.

The rotary shaft 10 is formed in a bar shape extending in an axial direction D4. The rotary shaft 10 is configured to be rotatable around the axis thereof (axial direction D4).

The rotor core 20 is formed in a columnar (cylindrical) shape. As shown in FIG. 2, in an example, the rotor core 20 is configured by laminating electromagnetic steel sheets (not shown) along the axial direction D4 of the rotary shaft 10. The rotor core 20 is fixed to the rotary shaft 10 so as to be rotatable together with the rotary shaft 10. The rotor core 20 includes a plurality of slots 21 disposed in a circumferential direction D1.

Each of the slots 21 is formed so as to extend along the axial direction D4 of the rotor core 20. As shown in FIG. 1, the plurality of slots 21 are disposed so as to be spaced from one another in the circumferential direction D1 of the rotor core 20. In the present embodiment, each of the slots 21 is formed substantially in a U shape in a sectional view. In the present invention, the "sectional view" means "the sectional view cut along a plane orthogonal to the rotary shaft 10 (orthogonal to the axial direction D4 of the rotary shaft 10) unless otherwise specified.

A plurality of the magnet parts 30 are provided. Each of the plurality of magnet parts 30 is stored in each of the plurality of slots 21. Each of the magnet parts 30 includes a first sintered magnet 31, a second sintered magnet 32, and a connecting member 33. The description below about the first sintered magnet 31, the second sintered magnet 32 and the connecting member 33 is based on the sectional view unless it is clear that the description is not based on the sectional view.

The first sintered magnets 31 in a pair are provided. Each of the first sintered magnets 31 has a bar shape. Specifically, the shape of each of the first sintered magnets 31 is a rectangle. Each of the first sintered magnets 31 is disposed so as to be inclined to the radial direction of the rotor core 20. Specifically, as shown in FIG. 1, each of the first sintered magnets 31 is disposed so as to come closer to the other first sintered magnet 31 along a radially inward direction D2 of the rotor core 20.

The second sintered magnet 32 has a curved shape curved in an arc shape. Specifically, the second sintered magnet 32 is formed substantially in a U shape. The expression of "substantially in a U shape" means the shape in which the whole part thereof is curved and in which the directions of the both ends facing are not limited to parallel to each other and the directions of the both ends facing may be within 90 degrees. Each of the both end surfaces of the second sintered magnet 32 faces each of the end surfaces in the side of the radially inward direction D2 of the pair of the first sintered magnets 31.

The connecting member 33 is made of resin. Specifically, the connecting member 33 is formed of resin which is injection moldable. The connecting member 33 is formed of, for example, nylon 66 type (Grilon). The connecting member 33 connects the pair of first sintered magnets 31 and the second sintered magnet 32. In an example, the connecting member 33 is disposed so as to surround the pair of first sintered magnets 31 and the second sintered magnet 32 in order to integrate the pair of first sintered magnets 31 and the second sintered magnet 32. That is, the connecting member 33 is disposed along the circumferential surfaces of the pair of first sintered magnets 31 and the second sintered magnet 32 while being in contact with the respective circumferential surfaces of the pair of first sintered magnets 31 and the circumferential surface of the second sintered magnet 32.

In the present embodiment, the connecting member 33 fills each of the slots 21. Thereby the connecting member 33 is disposed in contact with the inner surface of the slot 21 and the circumferential surfaces of the pair of first sintered magnets 31 and the second sintered magnet 32. In other words, the connecting member 33 is disposed so as to fill the gap between the inner surface of the slot 21 and the first sintered magnets 31 and between the inner surface of the slot 21 and the second sintered magnet 32.

The above-described rotor 1 operates as follows. As shown in FIG. 1, magnetic fluxes M of the first sintered magnets 31 concentrate at a position on an intermediate line L of the pair of first sintered magnets 31 (a line which is equally distant from the pair of first sintered magnets 31) because the first sintered magnets 31 are disposed to be inclined to the radial direction of the rotor core 20. Similarly as in the case of the pair of first sintered magnets 31, the magnetic fluxes M of the second sintered magnet 32 concentrate at a position on the intermediate line L (a line which is equally distant from the pair of first sintered magnets 31) because each of the end surfaces thereof faces one end surface of each of the pair of first sintered magnets 31. That is, the magnetic flux flows concentrate in a radially outward direction D3 along the intermediate line L.

The rotation of the rotor core 20 generates heat in the first sintered magnets 31 and the second sintered magnet 32, and thus the first sintered magnets 31 and the second sintered magnet 32 shrink. As a result, the distance between each of the first sintered magnets 31 and the second sintered magnet 32 and the distances between the surface of each of the slots 21 and each of the first sintered magnets 31 and between the surface of each of the slots 21 and the second sintered magnet 32 change. The connecting member 33 is deformed so as to absorb stress-strain generated between the inner surface of each of the slots 21 and each of the first sintered magnets 31 and between the inner surface of each of the slots 21 and the second sintered magnet 32.

Next, a method of manufacturing the rotor 1 is described. First, the rotor core 20 having the plurality of slots 21 is fixed to the rotary shaft 10. Then, the first sintered magnets 31 and the second sintered magnet 32, which are made separately, are disposed in each of the slots 21. At this time, the first sintered magnets 31 and the second sintered magnet 32 are disposed at the relative positions described above.

Then, the first sintered magnets 31 and the second sintered magnet 32 are inserted into and fixed to the plurality of slots 21 of the rotor core 20 by a jig (not shown). Then, resin fills each of the gaps in the rotor core 20 between the inner surface of each of the slots 21 and the first sintered magnets 31 and between the inner surface of each of the slots 21 and the second sintered magnet 32, and thereby the connecting member 33 is injection-molded. In the present embodiment, the connecting member 33 is formed so as to fill each of the gaps between the inner surface of each of the slots 21 and the surfaces of the first sintered magnets 31 and the second sintered magnet 32.

The rotor 1 of the present embodiment exerts the following effects as an example. A rotor 1 having an embedded magnet type structure includes the rotor core 20 which rotates around the rotary shaft 10 as a rotation center and which has the plurality of slots 21 disposed in the circumferential direction D1, and the plurality of magnet parts 30 respectively stored in the plurality of slots 21. Each of the plurality of magnet parts 30 includes the pair of first sintered magnets 31 each of which has a bar shape in a sectional view cut along a plane orthogonal to the rotary shaft 10 and each of which is disposed so as to come closer to the other first sintered magnet 31 along the radially inward direction D2 of the rotor core 20, the second sintered magnet 32 which has a curved shape curved in an arc shape in the sectional view and each of both end surfaces of which faces each of end surfaces in the radially inward direction D2 of the pair of first sintered magnets 31, and the connecting member 33 which is formed of resin and which connects each of the pair of first sintered magnets 31 and the second sintered magnet 32. Thereby, even if the first sintered magnets 31 and the second sintered magnet 32 shrink by heat, the connecting member 33 made of resin is able to absorb stress-strain generated by the shrinkage of the both sintered magnets. Accordingly, the curvature of the second sintered magnet 32 is further increased, thus enabling to concentrate the magnetic fluxes M to increase the torque thereof.

(2) In the sectional view, the connecting member 33 is disposed so as to be in contact with the inner surface of each of the plurality of slots 21 and the surfaces of the pair of first sintered magnets 31 and the second sintered magnet 32. Accordingly, the first sintered magnets 31 and the second sintered magnet 32 are fixed in each of the slots 21 by the connecting member 33, and the stress-strain in the first sintered magnets 31 and the second sintered magnet 32 is absorbed by the connecting member 33.

The present invention is not limited to the above-described embodiment. Various changes and modifications are available. In an example, in the above-described embodiment, the connecting member 33 is disposed so as to fill the entire gap between the surface of each of the slots 21 and the surfaces of the first sintered magnets 31 and the second sintered magnet 32. However, the invention is not limited to this. In an example, the connecting member 33 may be disposed so as to fill a part of the gap.

The first sintered magnet 31 and the second sintered magnet 32 may be formed to have different magnetic flux densities or formed of different material, not being limited to magnets having the same magnetic flux densities.

Further, in the embodiment, the plurality of slots are disposed so as to be spaced from one another in the circumferential direction of the rotor core, but the invention does not exclude a slot having such a shape in which the plurality of slots are partially connected to one another. That is, a slot, which is a part into which each individual magnet part is inserted, includes a slot formed by connecting adjacent slots.

EXPLANATION OF REFERENCE NUMERALS

1 ROTOR
10 ROTARY SHAFT
20 ROTOR CORE
21 SLOT
30 MAGNET PART
31 FIRST SINTERED MAGNET
32 SECOND SINTERED MAGNET
33 CONNECTING MEMBER
D1 CIRCUMFERENTIAL DIRECTION
D2 RADIALLY INWARD DIRECTION

What is claimed is:

1. A rotor having an embedded magnet type structure, the rotor comprising:
    a rotor core for rotating around a rotary shaft as a rotation center, the rotor core having a plurality of slots disposed in a circumferential direction; and
    a plurality of magnet parts respectively stored in the plurality of slots, wherein each of the plurality of magnet parts includes:
    a pair of first sintered magnets each having a bar shape in a sectional view cut along a plane orthogonal to the rotary shaft, the pair of first sintered magnets each being disposed so as to come closer to the other first sintered magnet along a radially inward direction of the rotor core;
    a second sintered magnet having a curved shape curved in an arc shape in the sectional view, each of both end surfaces of the second sintered magnet facing each of end surfaces in the radially inward direction of the pair of first sintered magnets; and
    a connecting member formed of resin, the connecting member directly connecting each of the pair of first sintered magnets and the second sintered magnet, and
    wherein the connecting member is arranged around the entire periphery of at least one of the first or second sintered magnets.

2. The rotor according to claim 1, wherein
in the sectional view, the connecting member is disposed so as to be in contact with an inner surface of each of the plurality of slots and surfaces of the pair of first sintered magnets and the second sintered magnet.

3. The rotor according to claim 2, wherein
in the sectional view, the connecting member is disposed so as to fill a gap between the inner surface of the slot and the first sintered magnets, and between the inner surface of the slot and the second sintered magnet.

4. The rotor according to claim 1, wherein
in the sectional view, each of the first sintered magnets is in a rectangular shape, and the second sintered magnet is substantially in a U shape.

* * * * *